(12) United States Patent
Garg et al.

(10) Patent No.: US 12,292,897 B2
(45) Date of Patent: *May 6, 2025

(54) METHOD, APPARATUS, AND COMPUTER-READABLE MEDIUM FOR EXTRACTING A SUBSET FROM A DATABASE

(71) Applicant: INFORMATICA LLC, Redwood City, CA (US)

(72) Inventors: Saurabh Garg, Patiala (IN); Anay Ghotikar, Bengaluru (IN)

(73) Assignee: INFORMATICA LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,044

(22) Filed: Aug. 15, 2022

(65) Prior Publication Data
US 2022/0391405 A1 Dec. 8, 2022

Related U.S. Application Data

(63) Continuation of application No. 17/144,721, filed on Jan. 8, 2021, now Pat. No. 11,416,511.

(60) Provisional application No. 62/959,403, filed on Jan. 10, 2020.

(51) Int. Cl.
G06F 17/00 (2019.01)
G06F 16/22 (2019.01)
G06F 16/23 (2019.01)
G06F 16/25 (2019.01)
G06F 16/901 (2019.01)

(52) U.S. Cl.
CPC ........ *G06F 16/254* (2019.01); *G06F 16/2282* (2019.01); *G06F 16/2365* (2019.01); *G06F 16/9024* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 10,242,065 B1* | 3/2019 | Starling | ............... | G06F 16/9024 |
| 10,430,462 B2* | 10/2019 | Gianetto | ............... | G06F 16/185 |
| 11,107,187 B2* | 8/2021 | Kim | .................. | G06T 11/206 |
| 2005/0171962 A1* | 8/2005 | Martin | ..................... | H03M 7/30 |
| 2011/0093479 A1* | 4/2011 | Fuchs | ..................... | G06F 40/30 |
| | | | | 707/E17.061 |
| 2017/0017679 A1* | 1/2017 | Jurowicz | ............. | G06F 16/2379 |
| 2017/0060958 A1* | 3/2017 | Van Rest | ............ | G06F 16/9024 |
| 2017/0147705 A1* | 5/2017 | Kasperovics | ....... | G06F 16/2433 |
| 2018/0203897 A1* | 7/2018 | Van Rest | ............ | G06F 16/9024 |

(Continued)

*Primary Examiner* — Hung D Le
(74) *Attorney, Agent, or Firm* — Reed Smith LLP; Amardeep S. Grewal

(57) ABSTRACT

An apparatus, computer-readable medium, and computer-implemented method for extracting a subset, including receiving a request comprising one or more criteria indicating one or more criteria tables in a plurality of tables of the database, storing an entity graph corresponding to a schema of the database and the one or more criteria, determining one or more top-most criteria entities in the entity graph, and generating the subset from the plurality of tables by traversing the entity graph starting at the one or more top-most criteria entities without traversing any directed edge more than once.

21 Claims, 14 Drawing Sheets

(56) References Cited

U.S. PATENT DOCUMENTS

| | | | |
|---|---|---|---|
| 2019/0306048 A1* | 10/2019 | Jadhav | H04L 45/021 |
| 2020/0233860 A1* | 7/2020 | Laino | G06F 16/2428 |
| 2020/0265090 A1* | 8/2020 | Hilloulin | G06F 16/9024 |
| 2020/0401583 A1* | 12/2020 | Church | G06F 16/245 |
| 2021/0097054 A1* | 4/2021 | Carter | G06F 17/10 |

* cited by examiner

Determine whether the entity graph includes strongly connected components in one or more cycles, wherein a cycle comprises a sequence of entities in the plurality of entities which are connected by a cyclical sequence of two or more directed edges in the plurality of directed edges

1001

Condense the entity graph to generate a condensed entity graph, the condensed entity graph comprising a plurality of condensed entities, each condensed entity corresponding to either a single entity in the plurality of entities or a cyclical entity

1002

Determine a topological sorting sequence of the plurality of condensed entities

1003

Traverse outgoing edges of each entity in each condensed entity in the plurality of condensed entities to update the subset with any records not previously included in the subset

METHOD, APPARATUS, AND COMPUTER-READABLE MEDIUM FOR EXTRACTING A SUBSET FROM A DATABASE

RELATED APPLICATION DATA

This applications is a continuation of U.S. patent application Ser. No. 17/144,721 filed Jan. 8, 2021, which claims priority to U.S. Provisional Application No. 62/959,403 filed Jan. 10, 2020, the disclosures of which are hereby incorporated by reference.

BACKGROUND

Enterprises frequently store large volumes of data across multiple tables in production databases, as well as in data warehouses. In order to effectively perform processes such as data testing, data analysis, and data reporting, it is sometimes necessary to extract information datasets from multiple tables at once.

For example, FIG. 1 shows a customer database that includes two tables, 101 and 102. The first table 101 lists the customer names and zip codes and the second table 102 lists IDs, customer names, and states. The Name field in the second table 102 may be a foreign key which points to the primary key of the Name field in the first table 101. In this case, if a user wishes to extract a subset of data for certain IDs, customer names, and corresponding states from table 102, then it will also be necessary to extract the corresponding zip code data from table 101 to ensure referential integrity. So, for example, if a user wanted to extract a data subset corresponding to the state value for the customer ID corresponding to ID=1, the data subset would include the values Robert and New York, as well as the value 11357.

FIG. 1 illustrates a simple example, but when there are many data dependencies between multiple tables, determining the appropriate subset of data to compile from all of the appropriate tables can be a complex and resource-intensive task.

Subset extraction from production databases is required when creating sandboxes or populating test environments which need data that mirrors the production data. Relational databases and many services such as Salesforce store data in multiple objects/tables which have relationships with other objects/tables. These relationships give rise to complex schemas which can be modeled as a graph where objects are vertices and relationships are edges.

When extracting a subset from these databases, it is often desirable that the referential integrity within the subset is maintained so as to mirror relationships present in the production data. A subset is obtained by starting with a set of filtered records in one of the objects and selecting records by performing join operations with related objects as the graph is traversed. There are a number of ways to traverse the schema graph. Prior traversal schemes may lead to the problem of no selection in some objects (when an intersection operation is used); some others may end up selecting a bigger subset than required (when a union operation is used).

There are other schemes, such as the one described in U.S. Non-Provisional application Ser. No. 14/389,360, filed Dec. 13, 2012 (hereinafter "the '360 Application"), and the one described in U.S. Non-Provisional application Ser. No. 15/288,023, filed Oct. 7, 2016 (hereinafter "the '023 Application"), the disclosures of which are hereby incorporated by reference in their entirety.

The '360 Application includes the concept of Major/Minor relationships wherein an additional condition is added to the subset problem: for each record that gets selected, all the records referring to that record should also be selected. While this method works well for simple schema, it ends up selecting a large subset in some cases in complex schemas where one object is related to another through multiple relationships, directly or indirectly, and is not scalable for large schemas as it requires a lot of joins.

Accordingly, there is a need for a simple and flexible way to obtain a minimal and referentially intact subset while avoiding a large subset and the complexity of defining a relationship as major/minor.

BRIEF DESCRIPTION OF THE DRAWINGS

FIG. 10 illustrates a flowchart for performing additional processing to ensure referential integrity according to an exemplary embodiment.

DETAILED DESCRIPTION

While methods, apparatuses, and computer-readable media are described herein by way of examples and embodiments, those skilled in the art recognize that methods, apparatuses, and computer-readable media for extracting a subset from a database are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium that aims to extract a minimal possible subset while maintaining referential integrity.

Unlike the '360 Application, the present method, apparatus, and computer-readable medium does not require completeness of data sets (completeness meaning that for each record that gets selected, all the records referring to that record and all the records referred by that record should also be selected) while still maintaining referential integrity (referential integrity meaning that for each record that gets selected, all the records referred by that record should also be selected). As discussed in the background, the completeness requirement may lead to large subsets which are not suitable for certain environments which have storage limitations (such as Salesforce sandboxes).

Figure 1:
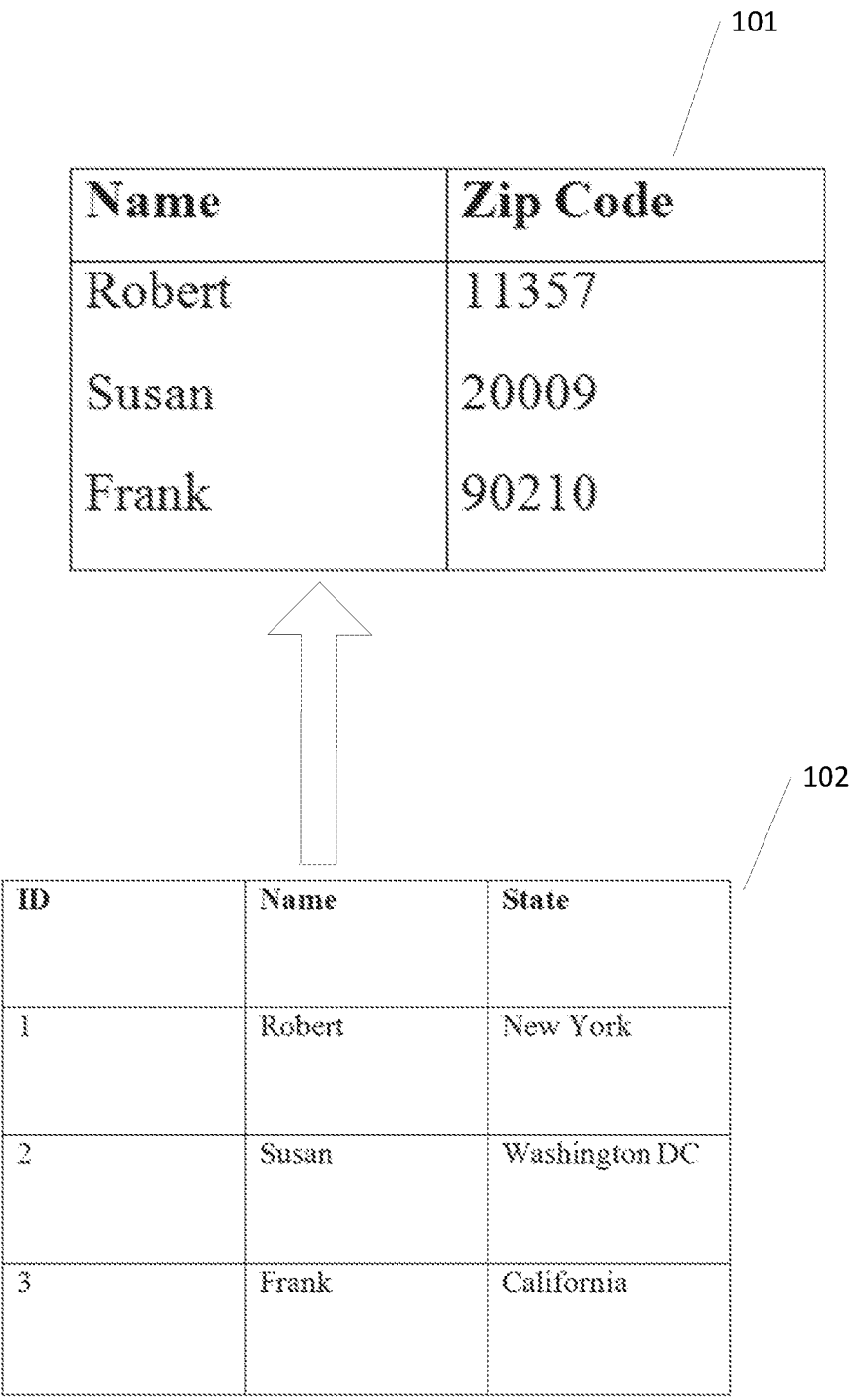
FIG. 1 illustrates an example of two data tables that can have a data dependency between them.
Figure 2:
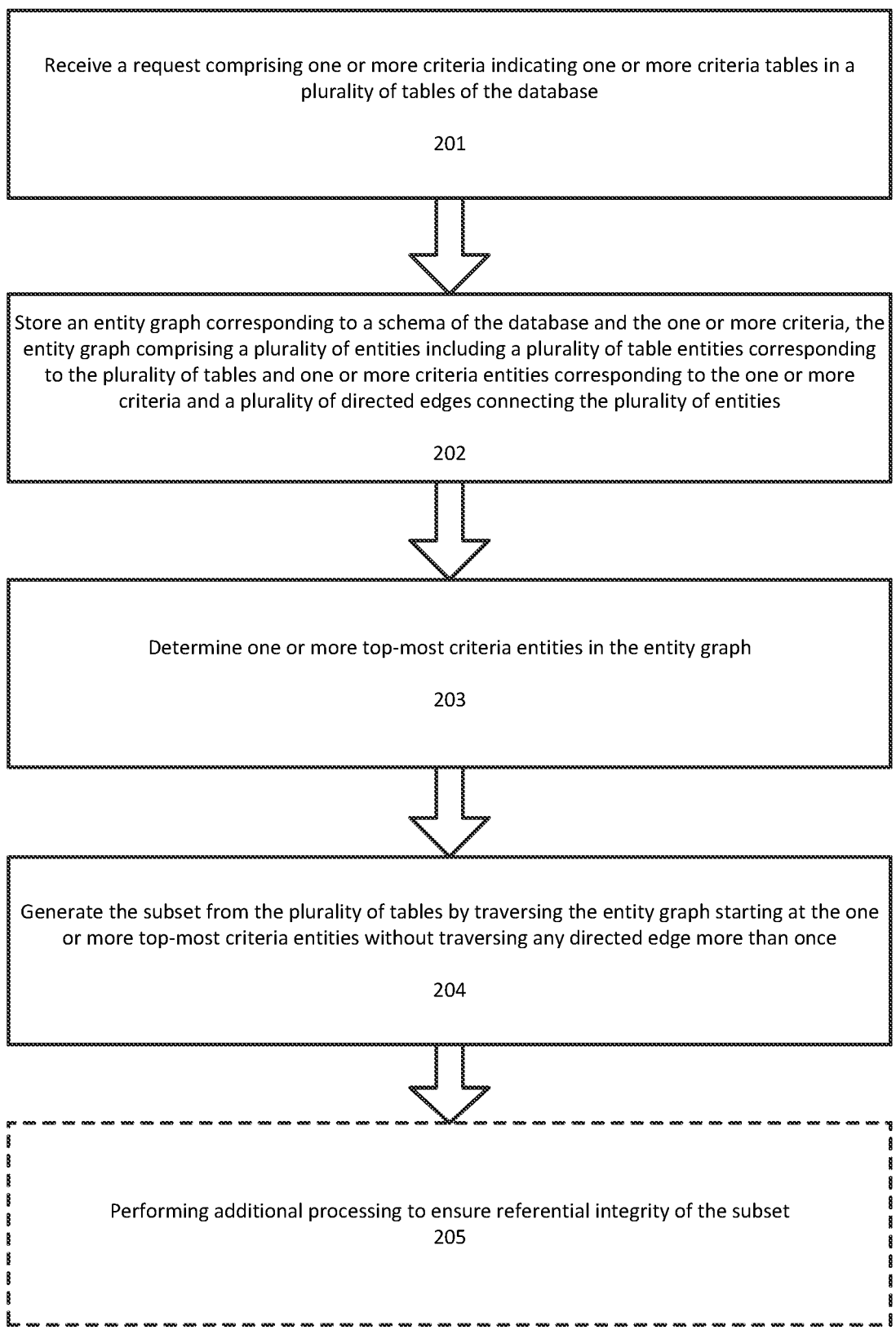
FIG. 2 illustrates a flowchart for extracting a subset of data from a database according to an exemplary embodiment.

FIG. 2 illustrates a flowchart for extracting a subset of data from a database according to an exemplary embodiment. At step 201 a request comprising one or more criteria indicating one or more criteria tables in a plurality of tables of a database is received. The request can be received from a user of the database and the criteria or criterion can correspond to a filter on one or more of the objects in the database, such as a table and table column. The table which is the subject of the criterion/criteria is referred to as the criteria table. For example, if there is a "Name" column in a "Contact" table of the database, the request can be:
SELECT*FROM Contact
WHERE Name='John Smith';

In this case, the criteria table is the Contact table and the criteria is where the value in the Name column in the Contact table is equal to "John Smith." The present application extracts a referentially intact subset of data from the tables of the database based on the request and the criteria. A referentially intact subset is one in which referential integrity is maintained. This means that if a record that references another record is selected in the subset, then the referenced record also gets selected in the subset. For example, a record in a child object must have a corresponding record in parent object i.e. the record to which it refers in the parent object. Typically, databases do not allow records to be inserted in child objects if the corresponding parent records do not exist. In context of subset computation, this means that if a child record qualifies as part of a subset, then its parent record will qualify too, otherwise referential integrity is broken.

Figure 3A:
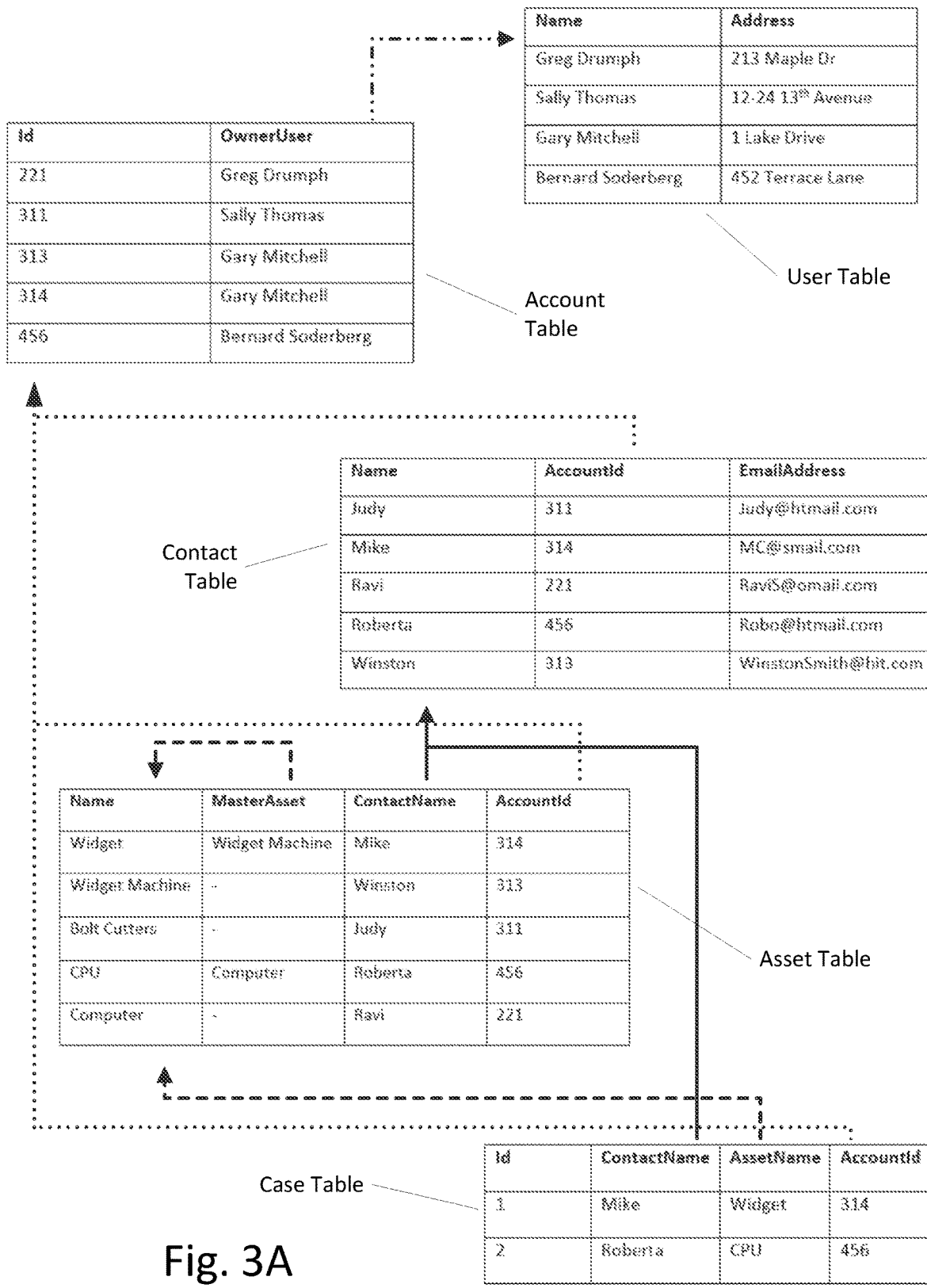
FIGS. 3A-3B illustrate an example database and a request according to an exemplary embodiment.

FIG. 3A illustrates an example database including a Case table, an Asset table, a Contact table, an Account table, and a User table. As shown in FIG. 3A, there are several relationships between the tables. A relationship is defined from a child table to a parent table when the child table contains a foreign key that references the primary key of the parent table. The arrows in FIG. 3A illustrate several child-parent relationships. For example, the dotted arrows indicate child-parent relationships from the Asset table to the Account table, the Case table to the Account table, and the Contact table to the Account table. This is because the AccountId column in each of the child tables is a foreign key which references the Id column of the Account table which is the primary key in the Account table.

Similarly, the dashed arrows indicate child-parent relationships where the Asset table is the parent. In this case, there is child-parent relationship from the Asset table to itself, since the "MasterAsset" foreign key in the Asset table points to the "Name" primary key in the Asset table. Additionally, the dashed and dotted line indicates a child-parent relationship between the Account table and the User table.

Figure 3B:
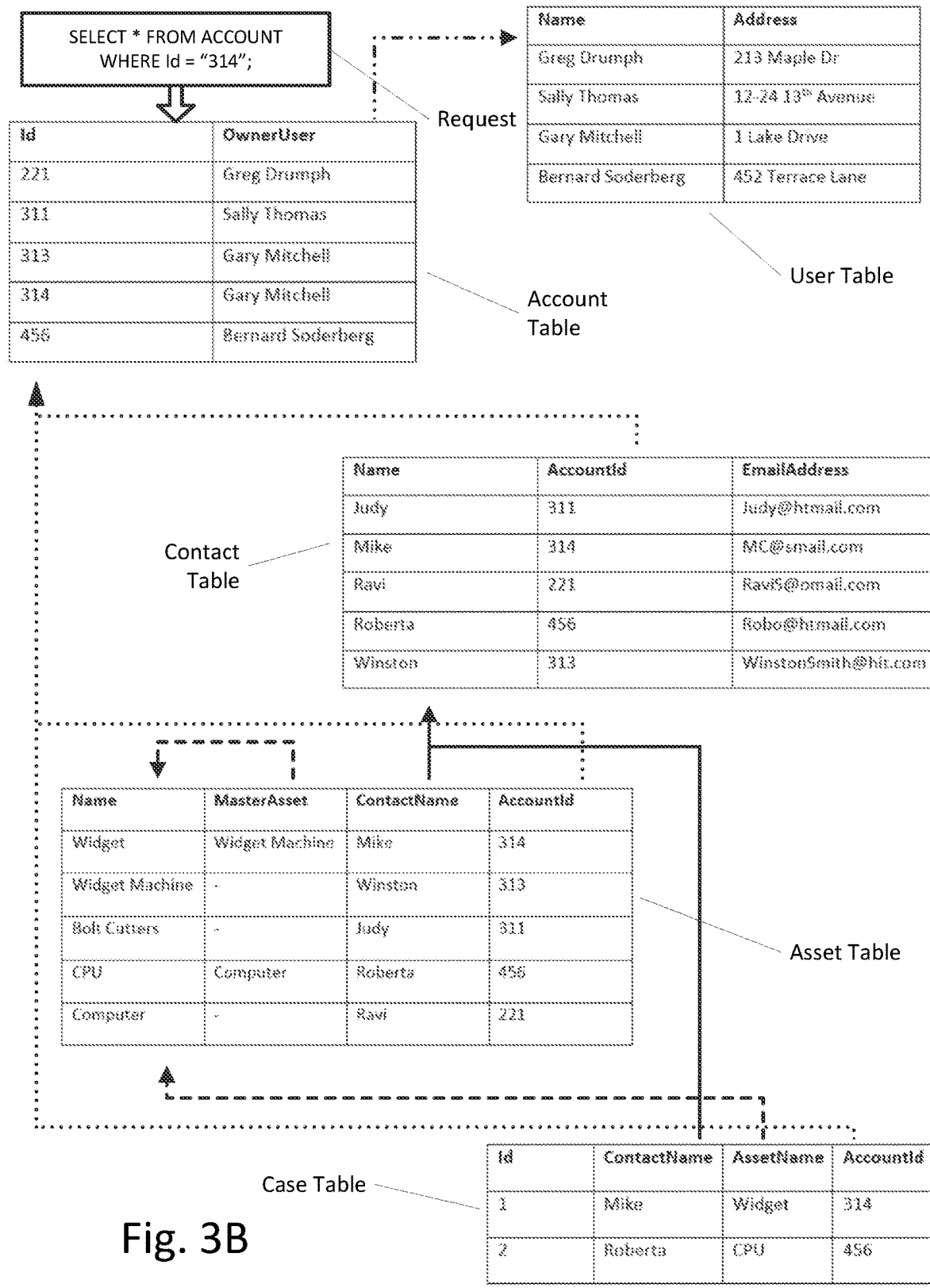

FIG. 3B illustrates the database of FIG. 3A along with a request which specifies a criterion table (the Account table) and a criterion (WHERE Id="314"). We see from FIG. 3B that this request results in the selection of the record with Id=314 and OwnerUser="Gary Mitchell" from the Account table. In order to extract a referentially intact subset of data from the database based on this criterion, it is therefore necessary to extract all records referred to by this record. In this case, the only record referred to by this record would be in the User table ("Gary Mitchell, 1 Lake Drive").

While traversing an edge from the parent-to-child direction is not required for maintaining referential integrity, it may be required to ensure that a subset is obtained for all objects in the schema. For example, if the only records selected for a subset based on the request in FIG. 3B were in the Account table and the User table, then the subset would not include any records for the Asset object, the Case object, or the Contact object. However, traversing an edge from parent-to-child can lead to additional child record selection and has the added cost of joins. It is therefore desirable to minimize the number of edges that should be traversed to span the entire graph.

Returning to FIG. 2, at step 202 an entity graph corresponding to a schema of the database and the one or more criteria is stored. The entity graph includes a plurality of entities including a plurality of table entities corresponding to the plurality of tables and one or more criteria entities corresponding to the one or more criteria and a plurality of directed edges connecting the plurality of entities. The entity graph can be generated/populated by retrieving the schema for the database and inserting criteria entities corresponding to the criteria specified for subset selection. Alternatively, the schema can include criteria entities for all tables and only the criteria entities which are specified can be selected The entity graph corresponding to a schema of the database for which the request is received can be generated based on the tables in the database, the relationships between the tables, and the criteria and/or can be stored in any format which preserves the information regarding the plurality of entities and the plurality of directed edges connecting the plurality of entities. For example, an entity object can be generated for each table in the database schema and each criteria and each of the directed edges can be stored in an edge object or as edge data.

Additionally, the entity graph can be implicit in the information already stored in the database and may not require generation. For example, any child-parent relationships among tables in the plurality of tables of the database will already be represented in the database through the use of a foreign key in the child table pointing to a primary key in the parent table. This information can be utilized to represent the entities corresponding to the child table and the parent table and the directed edge between them. The same type of information for all tables in the database can be utilized to represent all child-parent relationships and entities throughout the database.

The entity graph can be represented by a plurality of data structures (which can be generated from the database tables/schema or implicit in the data structures for the database tables). For example, the entity graph can include a plurality of table entity data structures corresponding to the database tables, a plurality of criteria entity data structures corresponding to the criteria, and a plurality of edge data structures corresponding to the relationships between the database tables and the criteria. For example, the entity data structure can include a reference or link to the table in database which the entity data structure corresponds to or the entity data structure can be some portion of the corresponding database table. Additionally the edge data structure can include information corresponding to the direction of the edge, such as the "from" entity and the "to" entity. Optionally, the information regarding the plurality of directed edges can be stored as part of the entity data structures. For example, the entity data structure can include one or more edge data structures corresponding to directed edges connected to the corresponding entity in the entity graph.

Figure 4:
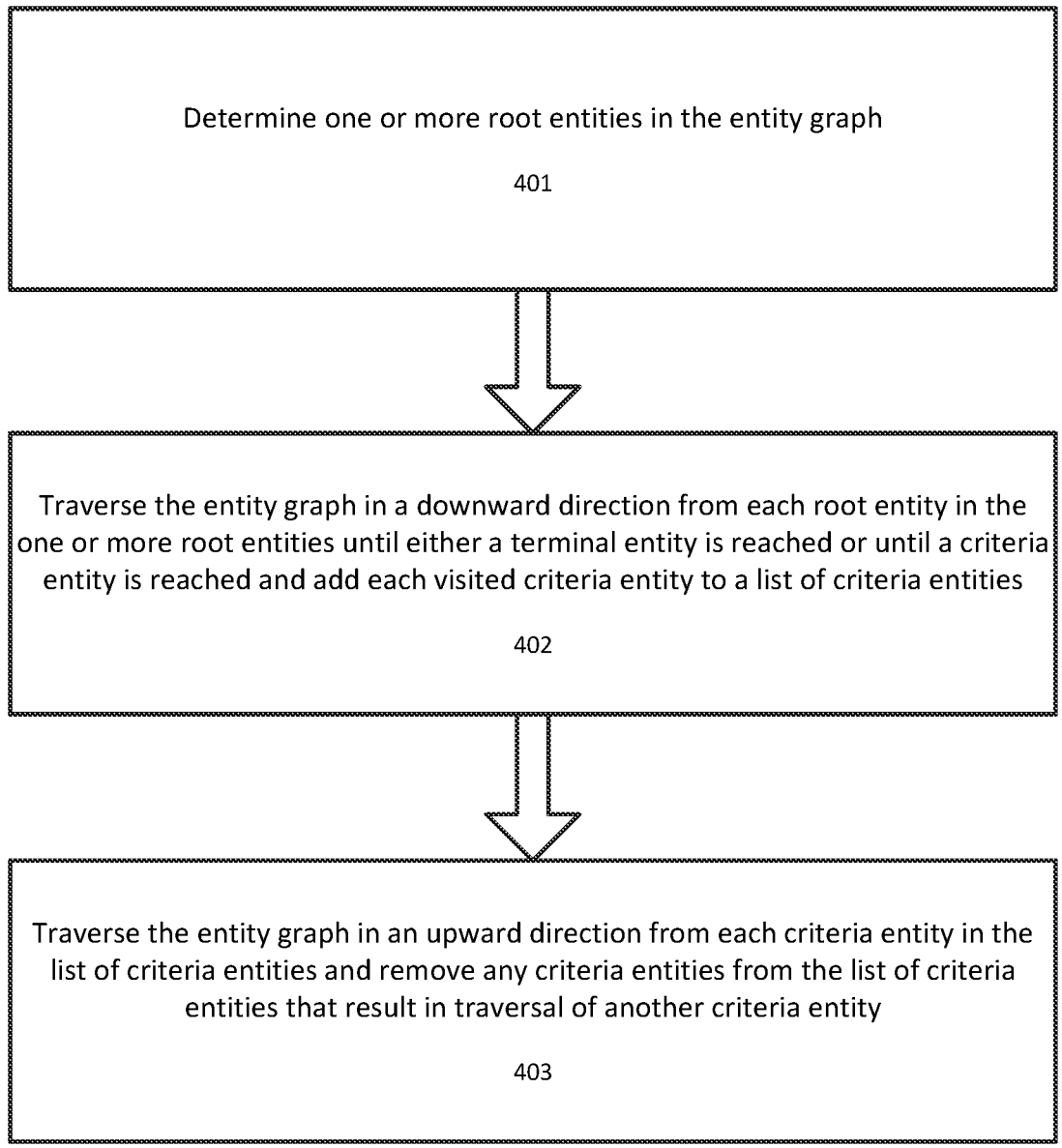
FIG. 4 illustrates a flowchart for determining the one or more top-most criteria entities in the entity graph according to an exemplary embodiment.

At step 203 one or more top-most criteria entities in the entity graph are determined. FIG. 4 illustrates a flowchart for determining the one or more top-most criteria entities in the entity graph according to an exemplary embodiment. The process shown in FIG. 4 is performed on an entity graph that does not contain any cycles. In the event that the entity graph contains cycles, the entity graph can be condensed into a condensed entity graph that replaces all cycles with condensed entities (nodes) that remove all cycles. The process for detecting cycles and condensing the entity graph are described in greater detail further in this specification. Once the process shown in FIG. 4 is completed and the top-most criteria entities are determined, the condensed entity graph can be expanded and any top-most criteria entities that are part of a condensed entity can be translated into the corresponding single criteria entity in the expanded entity graph. An example of this is described with respect to FIGS. 9A-9B.

At step 401 of FIG. 4, one or more root entities in the entity graph are determined. This determination can be made by traversing the entities in the entity graph in an upwards direction (child to parent) until one or more terminal nodes (entities without parents) are reached and identifying those terminal nodes as root entities.

At step 402 the entity graph is traversed in a downward direction (from parent to child) from each root entity in the one or more root entities until either a terminal entity is reached or until a criteria entity is reached and each visited criteria entity is added to a list of criteria entities.

At step 403 the entity graph is traversed in an upward direction (from child to parent) from each criteria entity in the list of criteria entities until a terminal node is reached and any criteria entities from the list of criteria entities that result in traversal of another criteria entity are removed from the list of criteria entities. In other words, any criteria entity that is determined to have a parent criteria entity during the upward traversal is automatically removed from the list of criteria entities.

The list of criteria entities, and "list" as generally used herein, can be any type data structure that can be used to track visited entities and/or traversed edges, such a textual list, a linked list, an array, a Boolean bit vector, a custom object, a structure, or any other type of data structure.

Figure 5:
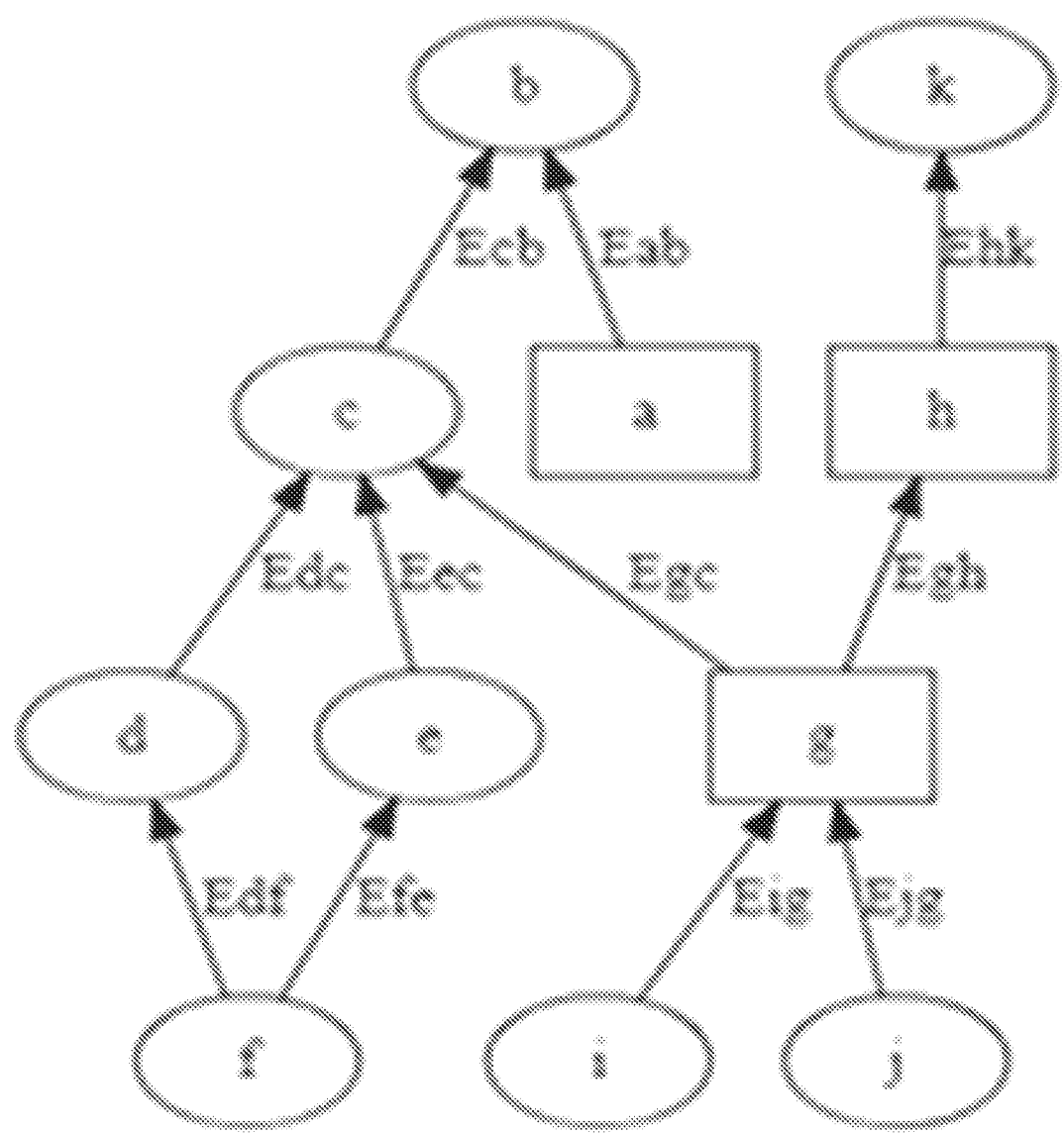
FIG. 5 illustrates an entity graph according to an exemplary embodiment.

FIG. 5 illustrates an entity graph according to an exemplary embodiment. As shown in FIG. 5, the oval entities correspond to table entities and the rectangular entities correspond to criteria entities. For example, entity c is a table entity and entity a is a criteria entity. Additionally, the entity graph includes directed edges labeled E[from vertex][to vertex]. For example, directed edge Edc runs from table entity d to table entity c. Each directed edge runs from child to parent. For example, table entity b is a parent of criteria entity a.

An example of determining the one or more top-most criteria entities in the entity graph will now be described with respect to the entity graph of FIG. 5. First, the root entities of the entity graph are determined to be entity b and entity k, since these entities have no parents (step 401 of FIG. 4).

Next, for each of these root entities, the graph is recursively traversed in a downward direction to cover all possible paths from that root. Each path is traversed until either a terminal node (e.g., a node with no children) is reached or a criteria entity is reached, and any visited criteria entities are added to a criteria entity list (step 402 of FIG. 4). This results in the following traversals from root entity b:

b→c→d→f
b→c→e→f
b→c→g
b→c→a

The only traversal from root entity k is k→h. Since a, g, and h are all visited criteria entities, they are added to the criteria entities list, giving a criteria entity list: {a, g, h}.

In the last step, the graph is traversed upwards from each of the criteria entities in the criteria entities list to cover all possible upward paths from each criteria entity and any criteria entity that is found to have a parent criteria entity is removed from the criteria entity list (step 403 of FIG. 4). This results in the traversal a→b for criteria entity a, the traversals g→c→b and g→h→k for criteria entity g, and h→k for criteria entity h. Since criteria entity g has another criteria entity in the upward traversal path (criteria entity h is a parent), then criteria entity g is removed from the list, giving a final criteria entity list: {a, h}. Criteria entities a and h are therefore determined to be the top-most criteria nodes.

Returning to FIG. 2, at step 204 the subset is generated from the plurality of tables by traversing the entity graph starting at the one or more top-most criteria entities without traversing any directed edge more than once.

Figure 6:
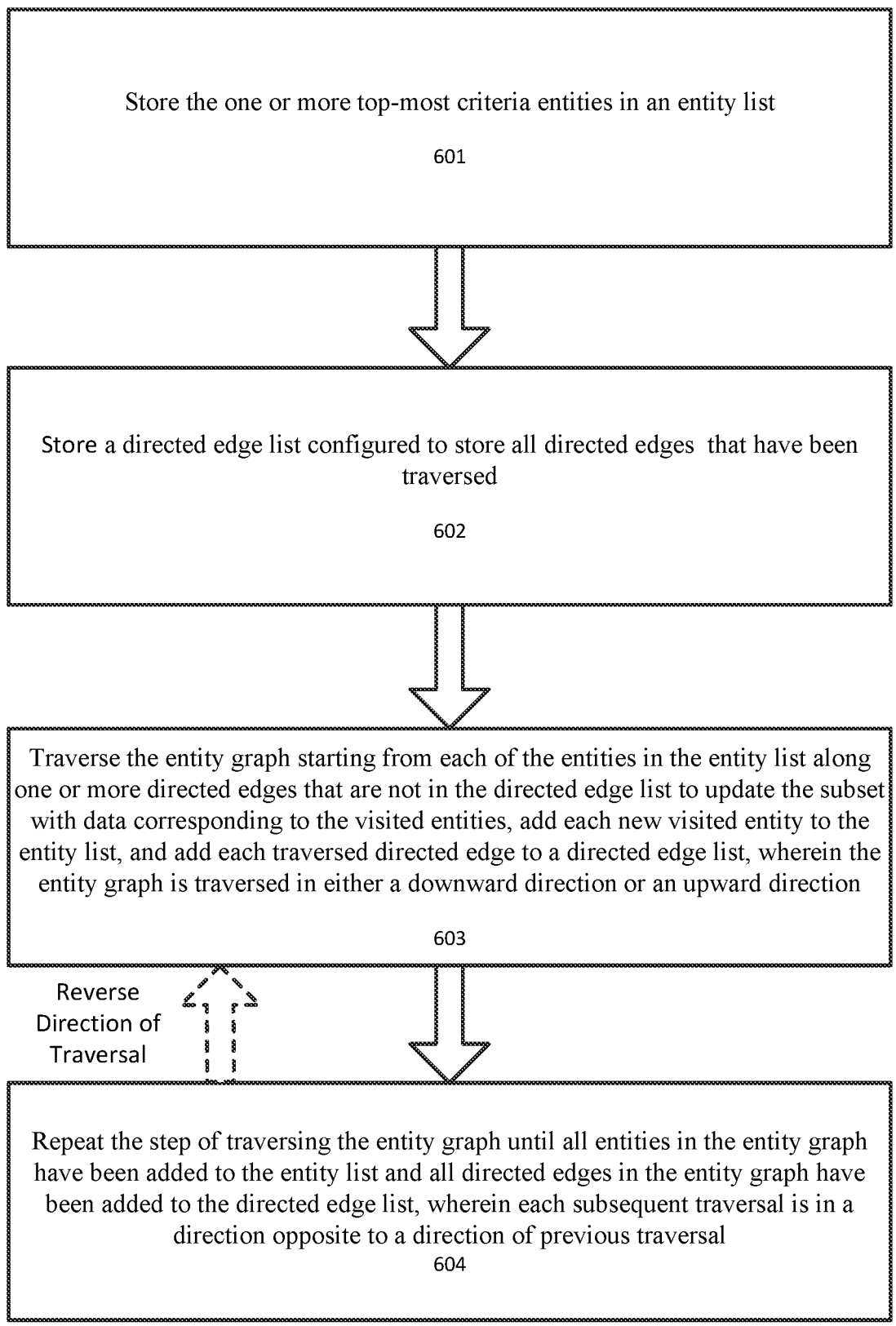
FIG. 6 illustrates a flow chart for generating a subset from the plurality of tables by traversing the entity graph starting at the one or more top-most criteria entities without traversing any directed edge more than once according to an exemplary embodiment.

FIG. 6 illustrates a flow chart for generating a subset from the plurality of tables by traversing the entity graph starting at the one or more top-most criteria entities without traversing any directed edge more than once according to an exemplary embodiment.

At step 601 the one or more top-most criteria entities are stored in an entity list. This entity list tracks all entities that have been visited during the subset generation process.

At step 602 a directed edge list is stored that is configured to store all directed edges that have been traversed. Optionally, the directed edge list can be instantiated at this step, although it will initially be empty since no edges have been traversed at the beginning of the process. As edges are traversed they are added to the directed edge list. Additionally, before traversing any directed edge, the system will check the directed edge list to make sure the directed edge is not already on the list. If it is, then the directed edge will not be traversed.

At step 603 the entity graph is traversed starting from each of the entities in the entity list along one or more directed edges that are not in the directed edge list to update the subset with data corresponding to the visited entities, add each new visited entity to the entity list, and add each traversed directed edge to a directed edge list. The traversal of the entity graph in step 603 will be in either a downward (parent→child) or an upward (child→parent) direction, as will be discussed further below. The first time this step is performed, the traversal will be in the downward direction starting at the top-most criteria nodes.

At step 604, the step of traversing the entity graph is repeated until all entities in the entity graph have been added to the entity list and all directed edges in the entity graph have been added to the directed edge list, with each subsequent traversal being in a direction opposite to a direction of previous traversal. Step 604 can include determining whether all entities in the entity graph have been added to the entity list and all directed edges in the entity graph have been added to the directed edge list. If not then step 604 can again call step 603 and indicate that the direction of traversal should be reversed from the previous direction of traversal. This can be performed, for example, by storing a flag value that initializes to 0 (corresponding to downward traversal) and alternates between 0 and 1 (corresponding to upward traversal) after every traversal.

Since step 603 updates the entity list as the traversal is performed, every iteration of the traversal will begin at each of the entities in the update entity list, as will be described in greater detail below.

Figure 7:
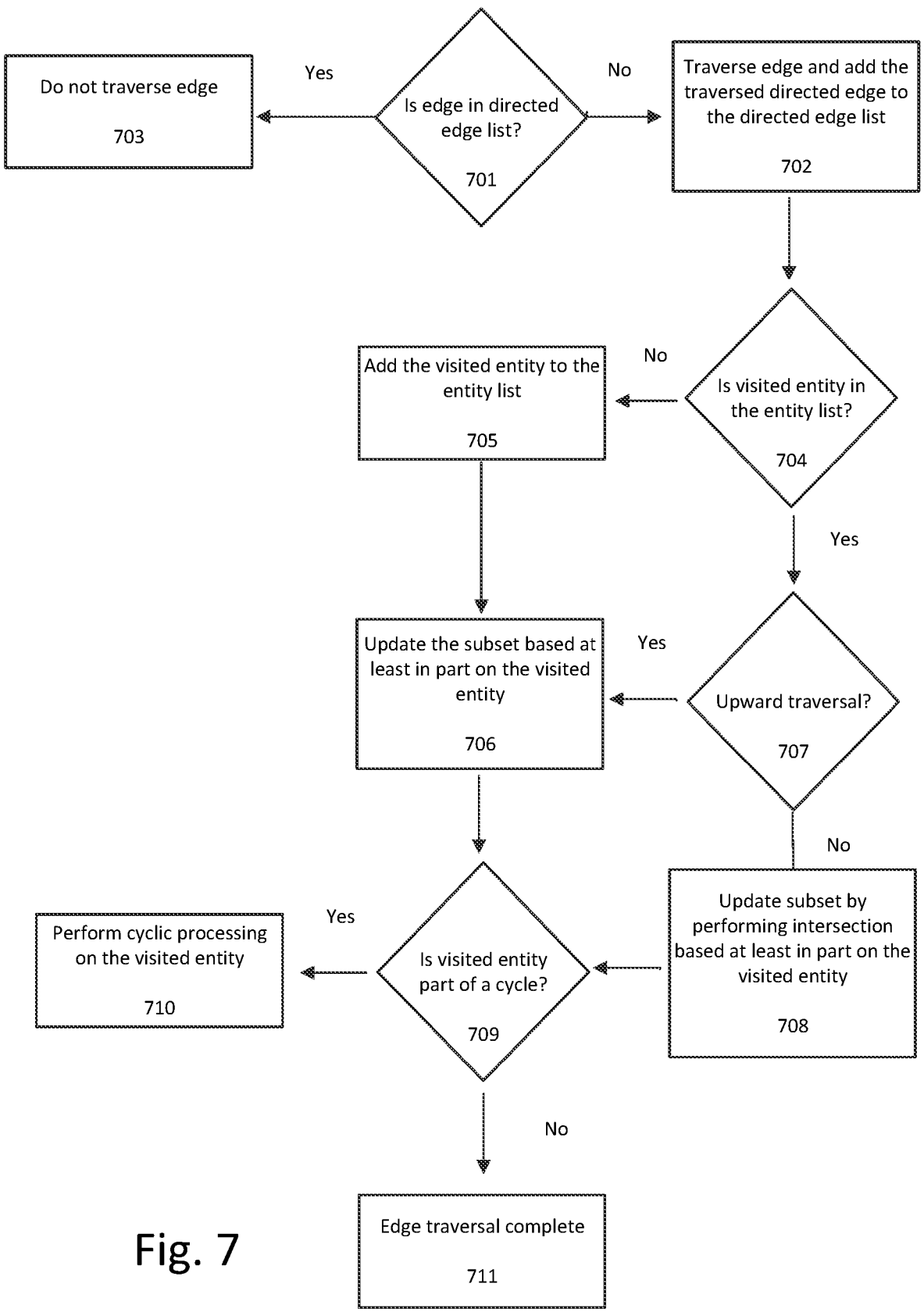
FIG. 7 illustrates a flowchart of the process performed for each edge traversal when traversing the entity graph starting from each of the entities in the entity list along one or more directed edges that are not in the directed edge list to update the subset with data corresponding to the visited entities according to an exemplary embodiment

FIG. 7 illustrates a flowchart of the process performed for each edge traversal when traversing the entity graph starting from each of the entities in the entity list along one or more directed edges that are not in the directed edge list to update the subset with data corresponding to the visited entities according to an exemplary embodiment. As shown in the figure and discussed in greater detail below, the process varies depending on whether the traversal is an upward traversal or a downward traversal.

At step 701 a determination is made whether the edge is in the directed edge list. If so, then at step 703 the edge is not traversed and the process proceeds to the next directed edge from that entity in the entity list or to the next directed edge from another entity in the entity list if there are no more edges from that entity that have not been traversed.

If the edge is not in the directed edge list, then at step 702 the edge is traversed and added to the directed edge list. The entity (node) that is reached by this traversal is referred to as the visited entity.

At step 704 a determination is made regarding whether the visited entity is in the entity list. If the visited entity is not in the entity list, then this means the subset has not been updated based upon this visited entity and the process proceeds to step 705, where the visited entity is added to the entity list and step 706, where the subset is updated based at least in part on the visited entity.

Alternatively, if at step 704 the visited entity is determined to already be in the visited entity list, then at step 707 a determination is made regarding whether the traversal is an upward (child→parent) or a downward (parent→child) traversal. If the traversal is an upward traversal, then the process still proceeds to step 706 to update the subset based at least in part on the visited entity.

The process of updating the subset can vary depending on whether the visited entity is in the entity list (has been visited before) or whether the traversal is an upward or downward traversal.

In the event that the visited entity is not in the entity list and the visited entity is a table entity, a subset of records is determined from the table corresponding to the table entity using relevant criteria from existing criteria which is gathered from previous traversals of criteria entities. The existing criteria can be stored in the system and updated as criteria nodes are traversed. The relevant portions of the existing criteria are applied to the underlying database table to select the records which are necessary for the subset and to add those records to the subset, if they are not already in the subset.

When the visited entity is not in the entity list and the visited entity is a criteria entity, the existing criteria can be updated in order to be applied to connected table entities.

When the visited entity is already in the entity list and the traversal is an upward traversal, a subset of records is again determined from the table corresponding to the table entity using relevant criteria from the existing criteria. This is because an upward traversal of the entity graph to the same parent entity from multiple child entities amounts to a union of the records selected as a result of the first traversal and the records selected as a result of the second traversal. This covers the scenario where a parent entity has multiple children (for example, two different criteria entities). For example, "the statement SELECT * FROM Table WHERE Id=2 OR WHERE Name=Bob" can have a corresponding entity graph where the table entity has two children criteria entities. In this case, the final subset should include the records selected as a result of the first criteria entity and the records selected as a result of the second criteria entity.

If the visited entity is already in the entity list and the traversal is a downward traversal, then at step 708 the subset is updated by performing an intersection based at least in part on the visited entity. This is because a downward traversal of the entity graph to the same child entity from multiple parent entities amounts to an intersection of the records selected as a result of the first traversal and the records selected as a result of the second traversal. This covers the scenario where a child entity has multiple parents (for example, two different criteria entities). For example, "the statement SELECT * FROM Table WHERE Id=2 AND WHERE Name=Bob" can have a corresponding entity graph where the table entity has two parent criteria entities. In this case, the final subset should include only the records selected both as a result of the first criteria entity and as a result of the second criteria entity. Step 708 can compute a set of values corresponding to the existing criteria on the visited entity (when the visited entity is a table entity) and remove any values from the existing subset corresponding to that visited entity that are not in the computed set of values.

At step 709 a determination is made regarding whether the visited entity is part of a cycle, which is a closed path containing a sequence of entities that can be traversed without visiting any entity twice. The entities that make up the cycle are sometimes referred to as strongly connected components (SCC). Cycles and SCC's as used herein refer to a sequence of entities in the plurality of entities which are connected by a cyclical sequence of two or more directed edges in the plurality of directed edges. Cycles that include only a single entity are not included in this determination and are referred to as self-cyclic.

As discussed above, the components of a graph which form a cycle are said to be strongly connected. Strongly connected components (cycles within the graph) can be identified using, for example, Tarjan's algorithm for finding strongly connected components. This algorithm takes a directed graph as input, and produces a partition of the graph's vertices into the graph's strongly connected components. Tarjan's algorithm performs a single pass of depth first search. It maintains a stack of vertices that have been explored by the search but not yet assigned to a component, and calculates "low numbers" of each vertex (an index number of the highest ancestor reachable in one step from a descendant of the vertex) which it uses to determine when a set of vertices should be popped off the stack into a new component. Each vertex of the graph appears in exactly one of the strongly connected components. Any vertex that is not on a directed cycle forms a strongly connected component all by itself: for example, a vertex whose in-degree or out-degree is 0, or any vertex of an acyclic graph.

Of course, other algorithms for identifying strongly connected components (cycles) within the entity graph can also be utilized, such as Kosaraju's algorithm, which uses two passes of depth first search or an algorithm that uses depth-first search in combination with two stacks, one to keep track of the vertices in the current component and the second to keep track of the current search path.

Returning to FIG. 7, if the visited entity is part of a cycle, then cyclic processing is performed on the visited entity. Cyclic processing a recursive process that is described in greater detail with respect to FIG. 8. If the visited entity is not part of a cycle, then at step 711 the edge traversal is complete.

In sum, the process of traversing the entity graph starting from each of the entities in the entity list along one or more directed edges that are not in the directed edge list to update the subset with data corresponding to the visited entities includes the following steps for each visited entity:
  (a) adding the traversed directed edge to the directed edge list, assuming that the traversed edge was not already in the directed edge list (in which case no traversal would be made);
  (b) determining whether the visited entity is in the entity list;
  (c) determining whether a direction of traversal is an upward direction or an downward direction, and performing one of:
    (i) adding the visited entity to the entity list and updating the subset based at least in part on the visited entity when the visited entity is not in the entity list,
    (ii) updating the subset based at least in part on the visited entity when the visited entity is in the entity list and the direction of traversal is the upward direction, or
    (iii) performing an intersection of records in the subset with records determined based at least in part on the visited entity when the visited entity is in the entity list and the direction of traversal is the downward direction.

The process of traversing the entity graph starting from each of the entities in the entity list along one or more directed edges that are not in the directed edge list to update the subset with data corresponding to the visited entities also includes the following steps for each visited entity:
  (a) determining whether the visited entity is part of a cycle comprising a sequence of entities in the plurality of entities which are connected by a cyclical sequence of two or more directed edges in the plurality of directed edges; and
  (b) performing cyclic processing on the visited entity based at least in part on a determination that the visited entity is part of a cycle.

Figure 8:
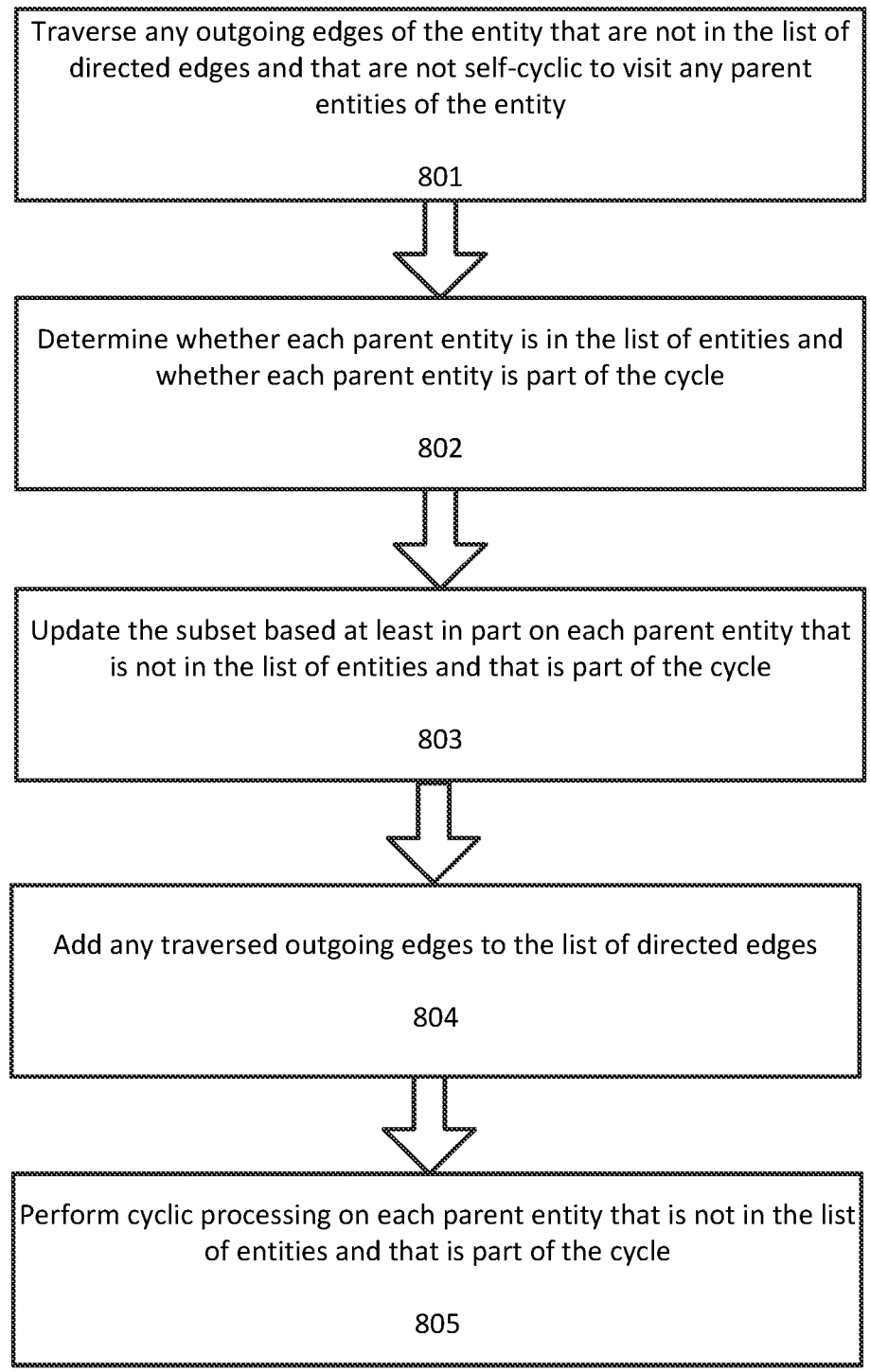
FIG. 8 illustrates a flowchart for performing cyclic processing on an input entity according to an exemplary embodiment.

FIG. 8 illustrates a flowchart for performing cyclic processing on an input entity according to an exemplary embodiment. For example, the initial iteration of the process would be performed on the visited entity passed in as shown in FIG. 7.

At step 801 any outgoing edges of the entity that are not in the list of directed edges and that are not self-cyclic are traversed (in an upward direction) to visit any parent entities of the entity.

At step 802 a determination is made regarding whether each parent entity is in the list of entities and whether each parent is part of the cycle. The second determination can be performed, as discussed earlier, by initially identifying all cycles and storing the entities in each cycle.

At step 803 the subset is updated based at least in part on each parent entity that is not in the list of entities and that is part of the cycle. This subset updating process is described above and includes the selection of records from a table corresponding to a table entity using criteria corresponding to a criteria entity.

At step 804 any traversed outgoing edges are added to the list of directed edges.

At step 805 cyclic processing is performed on each parent entity that is not in the list of entities and that is part of the cycle. This means that the entire process (steps 801-805) is then repeated for each of the parent entities that are not in the list of entities and that are part of the cycle. This can potential result in the process being performed recursively over multiple branching iterations until all edges have been traversed or all parent entities are added to the list of entities.

Figure 9A:
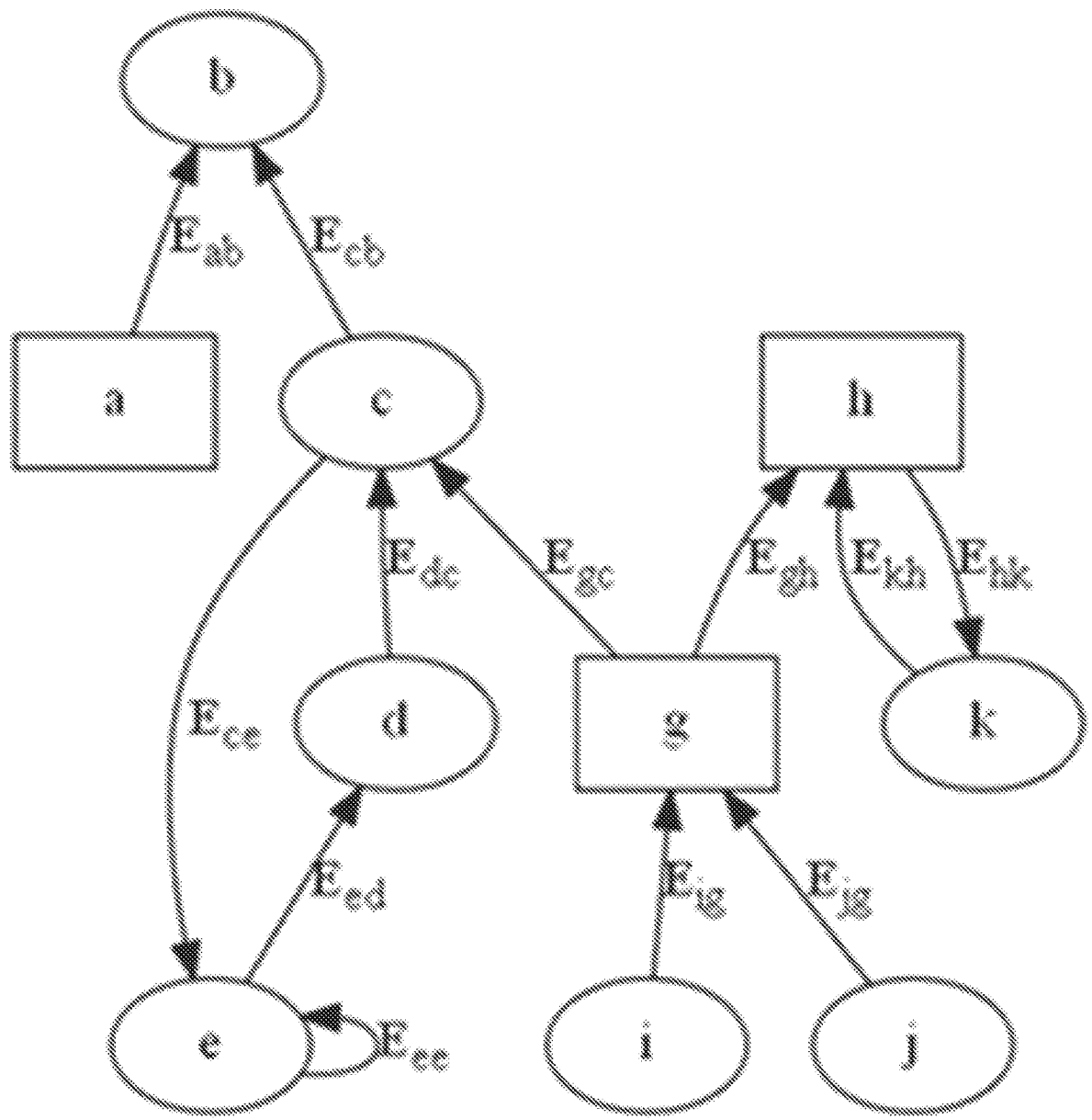
FIGS. 9A-9B illustrate an entity graph and a condensed entity graph according to an exemplary embodiment.
Figure 9B:
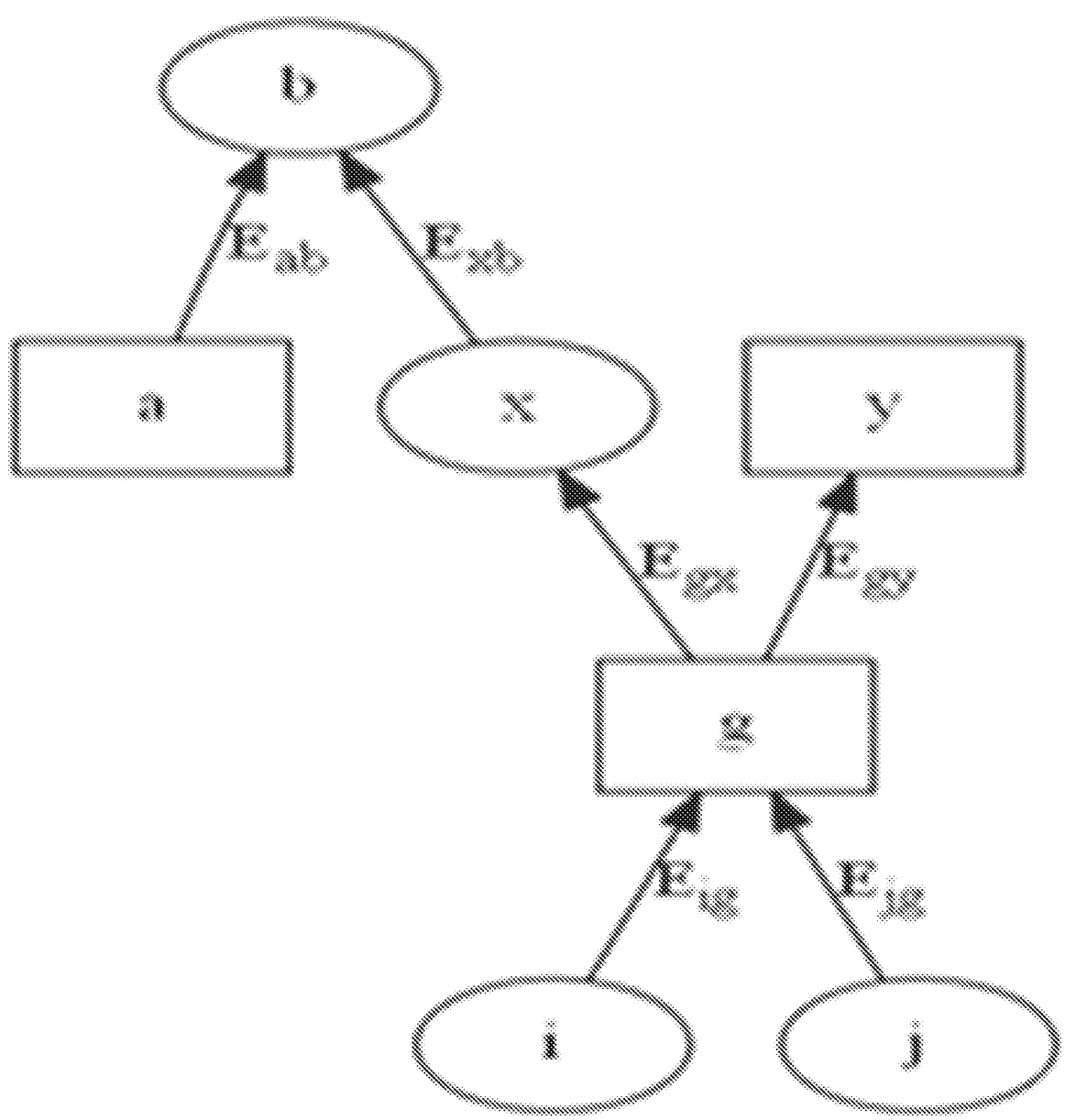

An example of the step of generating the subset from the plurality of tables by traversing the entity graph starting at the one or more top-most criteria entities without traversing any directed edge more than once is now described with respect to the entity graphs shown in FIGS. 9A-9B.

FIG. 9A illustrates an entity graph with table entities being represented as ovals, criteria entities being represented as rectangles, and directed edges (labeled "E") going from child entity to parent entity.

Prior to performing the step of generating the subset, it is necessary to determine the one or more top-most criteria entities in the entity graph. However, this step cannot be performed in an entity graph that contains cycles, as the entity graph shown in FIG. 9A does.

Therefore, the step of determining the one or more top-most criteria entities in the entity graph can include determining whether any cycles exist in the entity graph, condensing the entity graph to remove cycles, and then determining the top-most criteria entities in the condensed entity graph.

As discussed earlier, the step of determining whether any cycles exist in the entity graph can be performed by finding all Strongly Connected Components (SCCs) in a Digraph by using Tarjan's Strongly Connected Components Algorithm (excluding self-cycles). This will provide a List of a List of vertices, where each list of vertices is a single strongly connected component (SCC).

Then, in order to condense the entity graph when there are SCCs, the following process can be performed for each SCC:
  (a) Create a dummy vertex d that will be replacing the subgraph represented by SCC; and
  (b) For each vertex in the SCC, do the following:
    (i) Find all incoming edges, save them in-memory and remove from the graph and add new edges that have d as the Target vertex; and
    (ii) Find all outgoing edges, save them in-memory, remove from the graph, and add new edges that have d as the Source vertex Applying this process to the entity graph shown in FIG. 9A results in the condensed entity graph shown in FIG. 9B. As shown in FIG. 9B, the SCC {c, d, e,} in FIG. 9A is replaced by the condensed entity x, which is labeled as a table entity since c, d, and e are all table entities. Additionally, as shown in FIG. 9B, the SCC {h, k} is replaced by the condensed entity y, which is labeled as a criteria entity since at least one entity in the SCC (h) is a criteria entity. When condensing entities in an SCC, condensed entities that have at least one criteria entity in the corresponding SCC are labeled as criteria entities.

Applying the above-described process for determining top-most criteria entities to the condensed entity graph of FIG. 9B, we start from root nodes 'b' and 'y', we get 'a' and 'y' as topmost criteria entities.

Once the topmost criteria entities are determined, the graph is expanded back to the graph of FIG. 9A by reversing the process described above (alternatively the original graph can be stored and retrieved). Additionally, any topmost criteria entities that are part of an SCC are translated to the expanded graph by expanding the SCC and selecting the topmost criteria entity in the SCC. In this case, expanding condensed entity y from FIG. 9B, we get h as the topmost criteria vertex. The top-most criteria entities are therefore given by set S: {a, h}.

The traversal process used to build the subset is now described with reference to the expanded entity graph shown in FIG. 9A. For the purpose of these examples, the term "qualify" is used to denote the process of updating the subset to be extracted from the database.

(a) Iteration-1a (Downward Traversal): Set S={a, h}
  (i) Starting from 'a', subset is computed for subtree rooted at 'a'. Since 'a' has no children, this step does nothing
  (ii) Starting from 'h', subset is computed for 'g', 'j' and corresponding vertices and edges are added to S and $E_d$. Also, since 'h' is part of SCC, perform cyclic processing on h:
Cyclic Processing (h)
  1. set of Visited Edges VE={ }
  2. 'h' is part of SCC
  3. For each outgoing edge for 'h': $E_{hk}$
     a. $E_{hk}$ is not present in VE, not a self-cyclic edge
     b. Parent entity='k'. 'k' is part of SCC
     c. Qualify records in 'k', Add 'k' to S
     d. add to VE. VE={$E_{hk}$}
     e. perform cyclic processing on k
Cyclic Processing (k)
  1. VE={$E_{hk}$}
  2. 'k' is part of SCC
  3. For each outgoing edge for 'k': $E_{ke}$
     a. $E_{kh}$ is not present in VE, not a self-cyclic edge
     b. Parent entity='h'. 'h' is part of SCC
     c. Qualify records in 'h', Add 'h' to S
     d. Add to VE. VE={$E_{hk}$, $E_{kh}$}
     e. Cyclic processing (h). // this will stop in this step as 'h' is already processed above.
Edges Traversed Down: $E_d$={$E_{gh}$, $E_{ig}$, $E_{jg}$, $E_{kh}$, $E_{hk}$}
Visited Entity List: S={a, h, g, i, j, k}
(b) Iteration-1b (Upward Traversal): S={a, h, g, i, j, k}
  (i) Starting from 'a', its ancestor 'b' is processed. Add $E_{ab}$ to $E_u$ and 'b' to S. Since 'b' is the root, stop here
  (ii) Starting from 'h', since $E_{hk}$ is present in $E_d$ its ancestor 'k' is not processed.
  (iii) Starting from 'g', its ancestors 'c', 'e', 'd' and 'b' are processed, and corresponding vertices and edges are added to S and $E_u$. Since $E_{gh}$ is already present in $E_d$, processing is skipped along this path.
  (iv) Starting from 'i', since $E_{ig}$ is present in $E_d$ its ancestor 'g' is not processed.
  (v) Starting from 'j', since $E_{jg}$ is present in $E_d$ its ancestor 'g' is not processed.
  (vi) Starting from 'k', since $E_{kh}$ is present in $E_d$ its ancestor 'h' is not processed.
  (vii) Add 'c', 'd', 'e', 'b' to S.

Edges Traversed Up: $E_u$={$E_{ab}$, $E_{gc}$, $E_{ce}$, $E_{ed}$, $E_{dc}$, $E_{ee}$, $E_{cb}$}
Visited Entity List: S={g, i, j, k, c, e, d, b}
(c) Iteration-2a (Downward Traversal): Set S={g, i, j, k, c, e, d, b}
  (i) Starting from 'g', subset is computed for 'i' and 'j'
  (ii) Starting from 'i', this step does nothing since it does not have any children.
  (iii) Starting from 'j', this step does nothing since it does not have any children.
  (iv) Starting from 'k', nothing is processed since $E_{hk}$ is present in $E_u$
  (v) Starting from 'c', nothing is processed since $E_{de}$ is present in $E_u$
  (vi) Starting from 'e', nothing is processed since $E_{ee}$ and $E_{ce}$ is present in $E_u$
  (vii) Starting from 'd', nothing is processed since $E_{ed}$ is present in $E_u$
  (viii) Starting from 'b', nothing is processed since $E_{cb}$ and $E_{ab}$ is present in $E_u$ Since all edges and objects are processed, the traversal process is completed.

In certain scenarios, such as complex schemas or schemas containing serveral SCCs or self-cyclic components, it can be beneficial to perform additional processing to ensure referential integrity. Returning to FIG. 2, at optional step 205 additional processing is performed to ensure referential integrity. This step can be omitted depending upon user preferences and the complexity of the schema. For example, if a schema has no self-cyclic edges or strongly connected components, then this step can be omitted.

FIG. 10 illustrates a flowchart for performing additional processing to ensure referential integrity according to an exemplary embodiment.

At step 1001 a determination is made regarding whether the entity graph includes strongly connected components in one or more cycle, where a cycle comprises a sequence of entities in the plurality of entities which are connected by a cyclical sequence of two or more directed edges in the plurality of directed edges. As discussed earlier, this step can be performed using Tarjan's algorithm or other means.

At step 1002 the entity graph is condensed to generate a condensed entity graph, the condensed entity graph comprising a plurality of condensed entities, each condensed entity corresponding to either a single entity in the plurality of entities or a cyclical entity comprising a sequence of two or more entities in the plurality of entities which are connected by a cyclical sequence of one or more directed edges. The process for generating the condensed entity graph is described earlier with respect to FIGS. 9A-9B.

At step 1003 a topological sorting sequence of the plurality of condensed entities is determined. A topological sort of a directed graph is a linear ordering of its vertices such that for every directed edge uv from vertex u to vertex v, u comes before v in the ordering. In this case, u would have a lower topological sort position than v.

Figure 11:
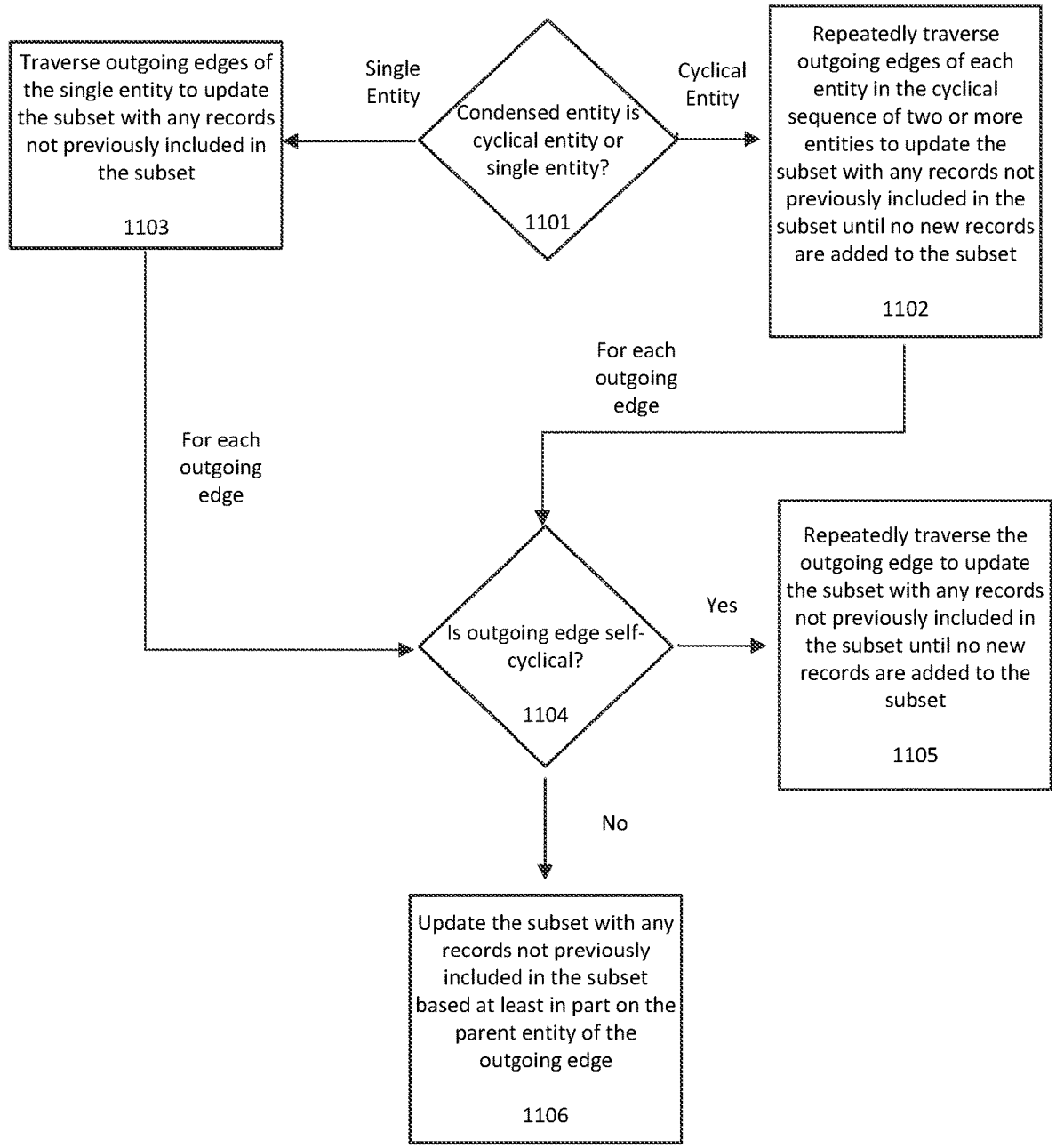
FIG. 11 illustrates a flowchart for traversing the outgoing edges of each entity in each condensed entity in the plurality of condensed entities to update the subset with any records not previously included in the subset according to an exemplary embodiment.

At step 1004 the outgoing edges of each entity in each condensed entity in the plurality of condensed entities are traversed to update the subset with any records not previously included in the subset. The condensed entities can be stored as separate data structures that track which entities are in the condensed entity. FIG. 11 illustrates a flowchart for traversing the outgoing edges of each entity in each condensed entity in the plurality of condensed entities to update the subset with any records not previously included in the subset according to an exemplary embodiment.

For each condensed entity, at step 1101, a determination is made regarding whether the condensed entity corresponds to a cyclical entity or a single entity. This can be determined, for example, by determining the number of entities in the condensed entity or the edges in the condensed entity.

If the condensed entity is a single entity, then at step 1102 outgoing edges of the single entity are traversed to update the subset with any records not previously included in the subset. This process is described earlier with respect to previous figures and involves applying criteria to the single entity to determine which records meet the subset criteria and adding any new records to the subset.

If the condensed entity is a cyclical entity, then at step 1103 outgoing edges of each entity in the cyclical sequence of the two or more entities that make up the cyclical entity are repeatedly traversed to update the subset with any records not previously included in the subset until no new records are added to the subset. This process continuously iterates through each of the entities in the cycle at least once, computes a subset on those entities, determines whether the overall subset is updated based on the computed subset, and terminates when the overall subset is no longer updated.

At step 1104, for each outgoing edge, a determination is made regarding whether the edge is self-cyclic. Self-cyclic edges have the same entity as both a parent and a child entity.

If the edge is self-cyclic, then at step 1105 the outgoing edge is repeatedly traversed to update the subset with any records not previously included in the subset until no new records are added to the subset. This process repeatedly computes a subset on the parent/child of the self-cyclic edge, determines whether the computed subset updates the overall subset, and stops the process when the overall subset is no longer updated.

If the edge is not self-cyclic, then at step 1106 the subset is updated with any records not previously included in the subset based at least in part on the parent entity of the outgoing edge, as described above with respect to steps 1102 and 1103.

An example of this step of performing additional processing to ensure referential integrity is now described with respect to FIGS. 9A-9B:

Condense the graph of FIG. 9A to generate the graph shown in FIG. 9B.

Find the topological sorting sequence (TS) on the condensed graph. This gives TS={ j, g, y, x, a, b}

Expand the graph again to get the graph of FIG. 9A

Get a list of condensed entities C by expanding SCCs in the TS. This gives C={[i], [j], [g], [h, k], [c, d, e], [a], [b]}

For each condensed entity c in C:
(a) Process [i]
  (i) [i] is not SCC
  (ii) Qualify records in parent entities of T by processing Eig
(b) Process [j]
  (i) [j] is not SCC
  (ii) Qualify records in parent entities of T by processing Ejg
(c) Process [g]
  (i) [g] is not SCC
  (ii) Qualify records in parent entities of 'g' by processing Egc and Egh
(d) Process [h, k]
  (i) This is an SCC
  (ii) Starting from 'h', process edges Ehk and Ekh until there are updates=0. Here updates=sum of updates of all edges in a condensed entity.
(e) Process [c, d, e]
  (i) This is an SCC
  (ii) Starting from 'c', process edges Ece, Eed, Eee and Edc until there is updates=0. Since Eee is a self-cycle, it is repeatedly processed until no more updates are made to the subset.
(f) Process [a]
  (i) [a] is not SCC
  (ii) Qualify records in parent vertices of 'a' by processing Eab
(g) Process [b]
  (i) No outgoing edge, finish The disclosed method and system for subsetting provides several technical advantages over existing systems such as Very Fast Database Sampling (VFDS). For example, VFDS traversal fails when cycles are present, multi-table or self-reference whereas the disclosed system provides a referentially intact dataset.

Additionally, VFDS traversal in non-cyclic entities depends on various other schemes like finding common ancestors and detecting diamond patterns which is not required by the present system. Furthermore, as VFDS chooses starting table which has maximum number of records resulting in a overall large subset, whereas the present system aims to find a minimal possible subset with data in all tables.

Figure 12:
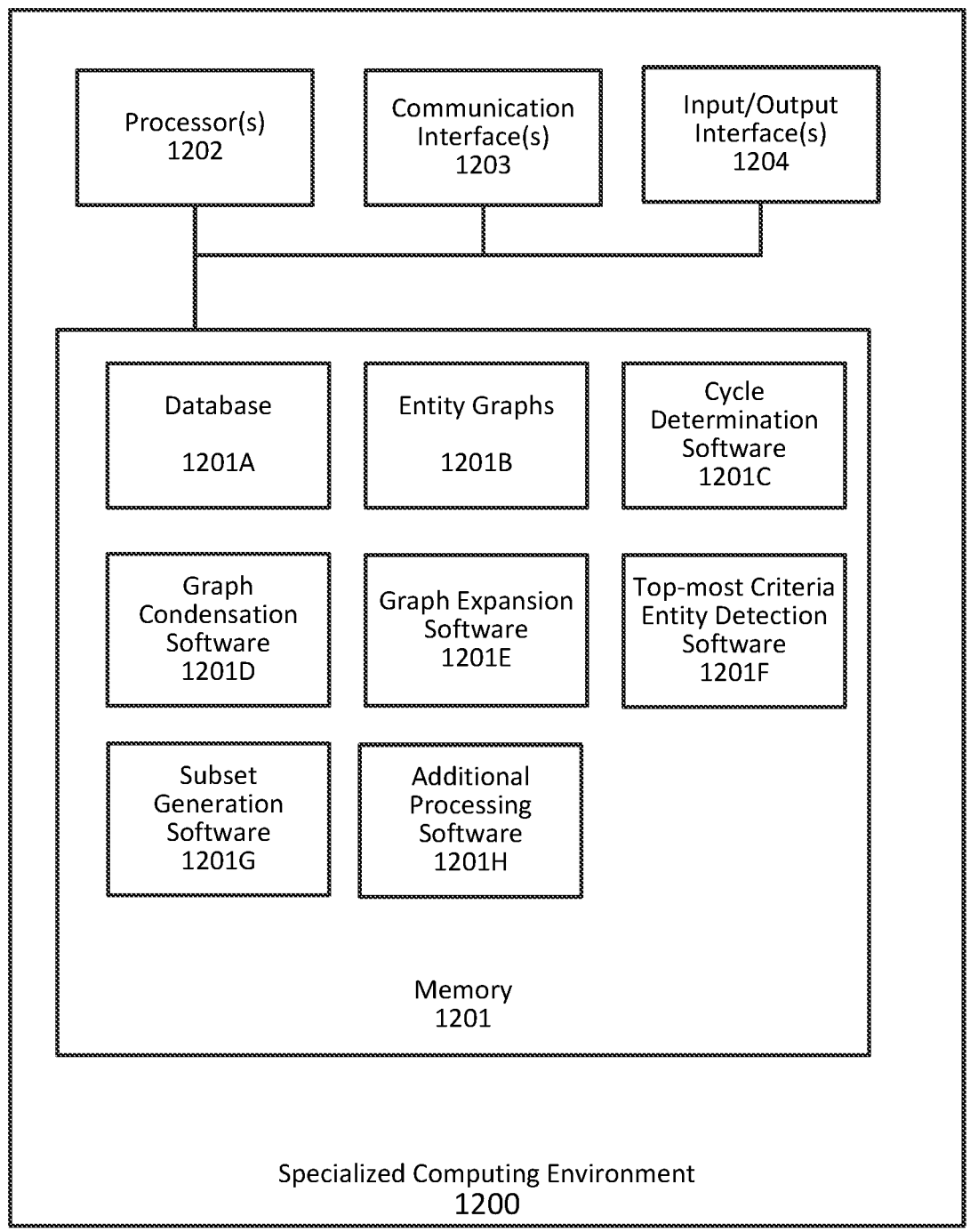
FIG. 12 illustrates the components of the specialized computing environment for extracting a subset of data from a database according to an exemplary embodiment.

FIG. 12 illustrates the components of the specialized computing environment 1200 configured to perform the processes described herein. Specialized computing environment 1200 is a computing device that includes a memory 1201 that is a non-transitory computer-readable medium and can be volatile memory (e.g., registers, cache, RAM), non-volatile memory (e.g., ROM, EEPROM, flash memory, etc.), or some combination of the two.

As shown in FIG. 12, memory 1201 can include a database 1201A storing the database to be subsetted or a portion thereof, entity graphs 1201B, cycle determination software 1201C, graph condensation software 1201D, graph expansion software 1201E, top-most criteria entity detection software 1201F, subset generation software 1201G, and additional processing (referential integrity validation) software 1201H. Each of the software components in memory 1201 store specialized instructions and data structures configured to perform the corresponding functionality and techniques described herein. Optionally, the database can be an external database and only a portion of the database corresponding to the subset is stored in memory 1201.

All of the software stored within memory 1201 can be stored as a computer-readable instructions, that when executed by one or more processors 1202, cause the processors to perform the functionality described with respect to FIGS. 2-11.

Processor(s) 1202 execute computer-executable instructions and can be a real or virtual processors. In a multi-processing system, multiple processors or multicore processors can be used to execute computer-executable instructions to increase processing power and/or to execute certain software in parallel.

Specialized computing environment 1200 additionally includes a communication interface 1203, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1200 further includes input and output interfaces 1204 that allow users (such as system administrators) to provide input to the system to display information, to edit data stored in memory 1201, or to perform other administrative functions.

An interconnection mechanism (shown as a solid line in FIG. 12), such as a bus, controller, or network interconnects the components of the specialized computing environment 1200.

Input and output interfaces 1204 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1200.

Specialized computing environment 1200 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1200.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for extracting a subset from a database, the method comprising:
   receiving, by at least one of the one or more computing devices, a request comprising one or more criteria indicating one or more criteria tables in a plurality of tables of the database;
   determining, by at least one of the one or more computing devices, one or more top-most criteria entities in an entity graph, wherein an entity graph corresponds to a schema of the database and the one or more criteria; and
   generating, by at least one of the one or more computing devices, the subset from the plurality of tables by iteratively traversing the entity graph, starting from each top-most criteria entity, along one or more directed edges that have not been previously traversed to update the subset with data corresponding to entities that have been traversed, wherein each subsequent traversal is in a direction opposite to a direction of previous traversal,
   wherein each directed edge is traversed once, and
   wherein each directed edge connects a pair of entities in the entity graph.

2. The method of claim 1, further comprising performing additional processing to ensure referential integrity of the subset by:
   determining, by at least one of the one or more computing devices, whether the entity graph includes strongly connected components in one or more cycles, wherein a cycle comprises a sequence of entities in the plurality of entities which are connected by a cyclical sequence of two or more directed edges in the plurality of directed edges;
   generating, by at least one of the one or more computing devices, a condensed entity graph, the condensed entity graph comprising a plurality of condensed entities, each condensed entity corresponding to either a single entity in the plurality of entities or a cyclical entity comprising a sequence of two or more entities in the plurality of entities which are connected by a cyclical sequence of one or more directed edges;
   determining, by at least one of the one or more computing devices, a topological sorting sequence of the plurality of condensed entities; and
   traversing, by at least one of the one or more computing devices, outgoing edges of each entity in each condensed entity in the plurality of condensed entities to update the subset with any records not previously included in the subset.

3. The method of claim 2, wherein traversing outgoing edges of each entity in each condensed entity in the plurality of condensed entities to update the subset with any records not previously included in the subset comprises, for each condensed entity:
   determining whether the condensed entity corresponds to a cyclical entity or a single entity; and either
   repeatedly traversing outgoing edges of each entity in the cyclical sequence of two or more entities to update the subset with any records not previously included in the subset until no new records are added to the subset based at least in part on a determination that the condensed entity corresponds to a cyclical entity; or
   traversing outgoing edges of the single entity to update the subset with any records not previously included in the subset based at least in part on a determination that the condensed entity corresponds to a single entity.

4. The method of claim 2, wherein traversing outgoing edges of each entity in each condensed entity in the plurality of condensed entities to update the subset with any records not previously included in the subset comprises, for each outgoing edge comprises:
   determining whether the outgoing edge is self-cyclic; and either:
   repeatedly traversing the outgoing edge to update the subset with any records not previously included in the subset until no new records are added to the subset based at least in part on a determination that the outgoing edge is self-cyclic; or
   updating the subset with any records not previously included in the subset based at least in part on the parent entity of the outgoing edge based at least in part on a determination that the outgoing edge is not self-cyclic.

5. The method of claim 1, wherein determining one or more top-most criteria entities in the entity graph comprises:
   determining one or more root entities in the entity graph;
   traversing the entity graph in a downward direction from each root entity in the one or more root entities until either a terminal entity is reached or until a criteria entity is reached; and
   traversing the entity graph in an upward direction from each criteria entity.

6. The method of claim 1, wherein traversing the entity graph starting from each top-most criteria entity along one or more directed edges that have not been previously traversed to update the subset with data corresponding to the visited entities, traversed entity:
   determining whether a direction of traversal is an upward direction or a downward direction; and
   adding the visited entity to an entity list and updating the subset based at least in part on the traversed entity when the traversed entity is not in the entity list;
   updating the subset based at least in part on the traversed entity when the traversed entity is in the entity list and the direction of traversal is the upward direction; or
   performing an intersection of records in the subset with records determined based at least in part on the traversed entity when the traversed entity is in the entity list and the direction of traversal is the downward direction.

7. The method of claim 1, wherein traversing the entity graph starting from each top-most criteria entity along one or more directed edges that have not been previously traversed to update the subset with data corresponding to the visited entities, comprises, for each traversed entity:
   determining whether the traversed entity is part of a cycle comprising a sequence of entities in the plurality of entities which are connected by a cyclical sequence of two or more directed edges in the plurality of directed edges; and
   performing cyclic processing on the traversed entity based at least in part on a determination that the traversed entity is part of a cycle.

8. An apparatus for extracting a subset from a database, the apparatus comprising:
   one or more processors; and
   one or more memories operatively coupled to at least one of the one or more processors and having instructions stored thereon that, when executed by at least one of the one or more processors, cause at least one of the one or more processors to:
      receive a request comprising one or more criteria indicating one or more criteria tables in a plurality of tables of the database;
      determine one or more top-most criteria entities in an entity graph, wherein an entity graph corresponds to a schema of the database and the one or more criteria; and
      generate the subset from the plurality of tables by iteratively traversing the entity graph, starting from each top-most criteria entity, along one or more directed edges that have not been previously traversed to update the subset with data corresponding to entities that have been traversed, wherein each subsequent traversal is in a direction opposite to a direction of previous traversal,
      wherein each directed edge is traversed once, and
      wherein each directed edge connects a pair of entities in the entity graph.

9. The apparatus of claim 8, wherein at least one of the one or more memories has further instructions stored thereon that, when executed by at least one of the one or more processors, cause at least one of the one or more processors to perform additional processing to ensure referential integrity of the subset by:
   determining whether the entity graph includes strongly connected components in one or more cycles, wherein a cycle comprises a sequence of entities in the plurality of entities which are connected by a cyclical sequence of two or more directed edges in the plurality of directed edges;
   generating a condensed entity graph, the condensed entity graph comprising a plurality of condensed entities, each condensed entity corresponding to either a single entity in the plurality of entities or a cyclical entity comprising a sequence of two or more entities in the plurality of entities which are connected by a cyclical sequence of one or more directed edges;
   determining a topological sorting sequence of the plurality of condensed entities; and
   traversing outgoing edges of each entity in each condensed entity in the plurality of condensed entities to update the subset with any records not previously included in the subset.

10. The apparatus of claim 9, wherein the instructions that, when executed by at least one of the one or more processors, cause at least one of the one or more processors to traverse outgoing edges of each entity in each condensed entity in the plurality of condensed entities to update the subset with any records not previously included in the subset further cause at least one of the one or more processors to, for each condensed entity:
   determine whether the condensed entity corresponds to a cyclical entity or a single entity; and either
   repeatedly traverse outgoing edges of each entity in the cyclical sequence of two or more entities to update the subset with any records not previously included in the subset until no new records are added to the subset based at least in part on a determination that the condensed entity corresponds to a cyclical entity; or
   traverse outgoing edges of the single entity to update the subset with any records not previously included in the subset based at least in part on a determination that the condensed entity corresponds to a single entity.

11. The apparatus of claim 9, wherein the instructions that, when executed by at least one of the one or more processors, cause at least one of the one or more processors to traverse outgoing edges of each entity in each condensed entity in the plurality of condensed entities to update the subset with any records not previously included in the subset further cause at least one of the one or more processors to, for each outgoing edge:
   determine whether the outgoing edge is self-cyclic; and either:
   repeatedly traverse the outgoing edge to update the subset with any records not previously included in the subset until no new records are added to the subset based at least in part on a determination that the outgoing edge is self-cyclic; or
   update the subset with any records not previously included in the subset based at least in part on the parent entity of the outgoing edge based at least in part on a determination that the outgoing edge is not self-cyclic.

12. The apparatus of claim 8, wherein the instructions that, when executed by at least one of the one or more processors, cause at least one of the one or more processors to determine one or more top-most criteria entities in the entity graph further cause at least one of the one or more processors to:
- determine one or more root entities in the entity graph;
- traverse the entity graph in a downward direction from each root entity in the one or more root entities until either a terminal entity is reached or until a criteria entity is reached; and
- traverse the entity graph in an upward direction from each criteria entity.

13. The apparatus of claim 8, wherein the instructions that, when executed by at least one of the one or more processors, cause at least one of the one or more processors to traverse the entity graph starting from each of the entities in the entity list along one or more directed edges that are not in the directed edge list to update the subset with data corresponding to the visited entities, add each new visited entity to the entity list, and add each traversed directed edge to a directed edge list further cause at least one of the one or more processors to, for each visited entity:
- determine whether a direction of traversal is an upward direction or a downward direction;
- add the visited entity to an entity list and updating the subset based at least in part on the traversed entity when the traversed entity is not in the entity list;
- update the subset based at least in part on the traversed entity when the traversed entity is in the entity list and the direction of traversal is the upward direction; or
- perform an intersection of records in the subset with records determined based at least in part on the traversed entity when the traversed entity is in the entity list and the direction of traversal is the downward direction.

14. The apparatus of claim 8, wherein the instructions that, when executed by at least one of the one or more processors, cause at least one of the one or more processors to traverse the entity graph starting from each of the entities in the entity list along one or more directed edges that are not in the directed edge list to update the subset with data corresponding to the visited entities, add each new visited entity to the entity list, and add each traversed directed edge to a directed edge list further cause at least one of the one or more processors to, for each visited entity:
- determine whether the traversed entity is part of a cycle comprising a sequence of entities in the plurality of entities which are connected by a cyclical sequence of two or more directed edges in the plurality of directed edges; and
- perform cyclic processing on the traversed entity based at least in part on a determination that the traversed entity is part of a cycle.

15. At least one non-transitory computer-readable medium storing computer-readable instructions for extracting a subset from a database that, when executed by one or more computing devices, cause at least one of the one or more computing devices to:
- receive a request comprising one or more criteria indicating one or more criteria tables in a plurality of tables of the database;
- determine one or more top-most criteria entities in an entity graph, wherein an entity graph corresponds to a schema of the database and the one or more criteria; and
- generate the subset from the plurality of tables by iteratively traversing the entity graph, starting from each top-most criteria entity, along one or more directed edges that have not been previously traversed to update the subset with data corresponding to entities that have been traversed, wherein each subsequent traversal is in a direction opposite to a direction of previous traversal, wherein each directed edge is traversed once, and wherein each directed edge connects a pair of entities in the entity graph.

16. The at least one non-transitory computer-readable medium of claim 15, further storing computer-readable instructions that, when executed by at least one of the one or more computing devices, cause at least one of the one or more computing devices to perform additional processing to ensure referential integrity of the subset by:
- determining whether the entity graph includes strongly connected components in one or more cycles, wherein a cycle comprises a sequence of entities in the plurality of entities which are connected by a cyclical sequence of two or more directed edges in the plurality of directed edges;
- generating a condensed entity graph, the condensed entity graph comprising a plurality of condensed entities, each condensed entity corresponding to either a single entity in the plurality of entities or a cyclical entity comprising a sequence of two or more entities in the plurality of entities which are connected by a cyclical sequence of one or more directed edges;
- determining a topological sorting sequence of the plurality of condensed entities; and
- traversing outgoing edges of each entity in each condensed entity in the plurality of condensed entities to update the subset with any records not previously included in the subset.

17. The at least one non-transitory computer-readable medium of claim 16, wherein the instructions that, when executed by at least one of the one or more computing devices, cause at least one of the one or more computing devices to traverse outgoing edges of each entity in each condensed entity in the plurality of condensed entities to update the subset with any records not previously included in the subset further cause at least one of the one or more computing devices to, for each condensed entity:
- determine whether the condensed entity corresponds to a cyclical entity or a single entity; and either
- repeatedly traverse outgoing edges of each entity in the cyclical sequence of two or more entities to update the subset with any records not previously included in the subset until no new records are added to the subset based at least in part on a determination that the condensed entity corresponds to a cyclical entity; or
- traverse outgoing edges of the single entity to update the subset with any records not previously included in the subset based at least in part on a determination that the condensed entity corresponds to a single entity.

18. The at least one non-transitory computer-readable medium of claim 16, wherein the instructions that, when executed by at least one of the one or more computing devices, cause at least one of the one or more computing devices to traverse outgoing edges of each entity in each condensed entity in the plurality of condensed entities to update the subset with any records not previously included in the subset further cause at least one of the one or more computing devices to, for each outgoing edge:
- determine whether the outgoing edge is self-cyclic; and either:
- repeatedly traverse the outgoing edge to update the subset with any records not previously included in the subset until no new records are added to the subset based at least in part on a determination that the outgoing edge is self-cyclic; or update the subset with any records not previously included in the subset based at least in part on the parent entity of the outgoing edge based at least in part on a determination that the outgoing edge is not self-cyclic.

19. The at least one non-transitory computer-readable medium of claim 15, wherein the instructions that, when executed by at least one of the one or more computing devices, cause at least one of the one or more computing devices to determine one or more top-most criteria entities in the entity graph further cause at least one of the one or more computing devices to:

determine one or more root entities in the entity graph;

traverse the entity graph in a downward direction from each root entity in the one or more root entities until either a terminal entity is reached or until a criteria entity is reached; and traverse the entity graph in an upward direction from each criteria entity.

20. The at least one non-transitory computer-readable medium of claim 15, wherein the instructions that, when executed by at least one of the one or more computing devices, cause at least one of the one or more computing devices to traverse the entity graph starting from each of the entities in the entity list along one or more directed edges that are not in the directed edge list to update the subset with data corresponding to the visited entities, add each new visited entity to the entity list, and add each traversed directed edge to a directed edge list further cause at least one of the one or more computing devices to, for each visited entity:

determine whether a direction of traversal is an upward direction or a downward direction;

add the visited entity to an entity list and updating the subset based at least in part on the traversed entity when the traversed entity is not in the entity list;

update the subset based at least in part on the traversed entity when the traversed entity is in the entity list and the direction of traversal is the upward direction; or perform an intersection of records in the subset with records determined based at least in part on the traversed entity when the traversed entity is in the entity list and the direction of traversal is the downward direction.

21. The at least one non-transitory computer-readable medium of claim 15, wherein the instructions that, when executed by at least one of the one or more computing devices, cause at least one of the one or more computing devices to traverse the entity graph starting from each of the entities in the entity list along one or more directed edges that are not in the directed edge list to update the subset with data corresponding to the visited entities, add each new visited entity to the entity list, and add each traversed directed edge to a directed edge list further cause at least one of the one or more computing devices to, for each visited entity:

determine whether the traversed entity is part of a cycle comprising a sequence of entities in the plurality of entities which are connected by a cyclical sequence of two or more directed edges in the plurality of directed edges; and perform cyclic processing on the traversed entity based at least in part on a determination that the traversed entity is part of a cycle.

\* \* \* \* \*